United States Patent [19]

Pitches et al.

[11] 4,237,537

[45] Dec. 2, 1980

[54] PRICE DISPLAY SETTING ARRANGEMENTS

[75] Inventors: Brian E. Pitches; Robert M. S. Murray; Ian A. Greig, all of Edinburgh, Scotland

[73] Assignee: Ferranti Limited, Hollinwood, England

[21] Appl. No.: 41,616

[22] Filed: May 23, 1979

[30] Foreign Application Priority Data

May 23, 1978 [GB] United Kingdom ............... 21527/78

[51] Int. Cl.[3] ............................................ G06F 15/56

[52] U.S. Cl. .................................. 364/465; 364/464; 364/479; 235/92 FL

[58] Field of Search ............... 364/464, 465, 510, 479; 235/92 FL, 92 CA; 222/23–28, 36, 76; 340/146.2, 146.1 BA, 183, 151, 152 R, 147 A, 149 A

[56] References Cited

U.S. PATENT DOCUMENTS

| | | | |
|---|---|---|---|
| 3,809,866 | 5/1974 | Scoville | 364/465 |
| 3,811,035 | 5/1974 | Brunone | 235/92 FL |
| 3,894,220 | 7/1975 | Levasseur | 364/479 |
| 3,973,242 | 8/1976 | Field et al. | 340/146.1 BA |
| 4,002,886 | 1/1977 | Sundelin | 340/147 A |
| 4,006,462 | 2/1977 | Podowski et al. | 340/146.1 BA |
| 4,107,777 | 8/1978 | Pearson et al. | 364/465 |

*Primary Examiner*—Charles E. Atkinson
*Assistant Examiner*—Gary Chin
*Attorney, Agent, or Firm*—Kerkam, Stowell, Kondracki & Clarke

[57] ABSTRACT

A unit price setting arrangement for differently priced products available from a remotely located dispenser for example, grades of fuel, from a pump, consists of a central transmitter and a receiver in each dispenser. The transmitter forms a series of fixed length binary words, one for each product, and transmits them in sequence repetitively. Each receiver counts words of the sequence received and compares them with the position of a selected product in the sequence to determine which word relates to the product of interest. That word only is used and is applied to a comparator with a corresponding word stored from a previous transmission to detect a change in the word. A shift register having a stored bit responds to an unsuccessful comparison to shift the bit through one location and a shift through a predetermined number of locations by successive unsuccessful comparisons, if the change is permanent, causes a controller to replace the stored value with the newly received one. The shift register is reset by a correct comparison if the change indicated by the comparison is not sustained and the stored value is unaltered. Thus any disturbance giving rise to a wrong binary word is ineffective but a deliberate change repeated over several transmissions is effective.

14 Claims, 2 Drawing Figures

PRICE DISPLAY SETTING ARRANGEMENTS

Figure 1:
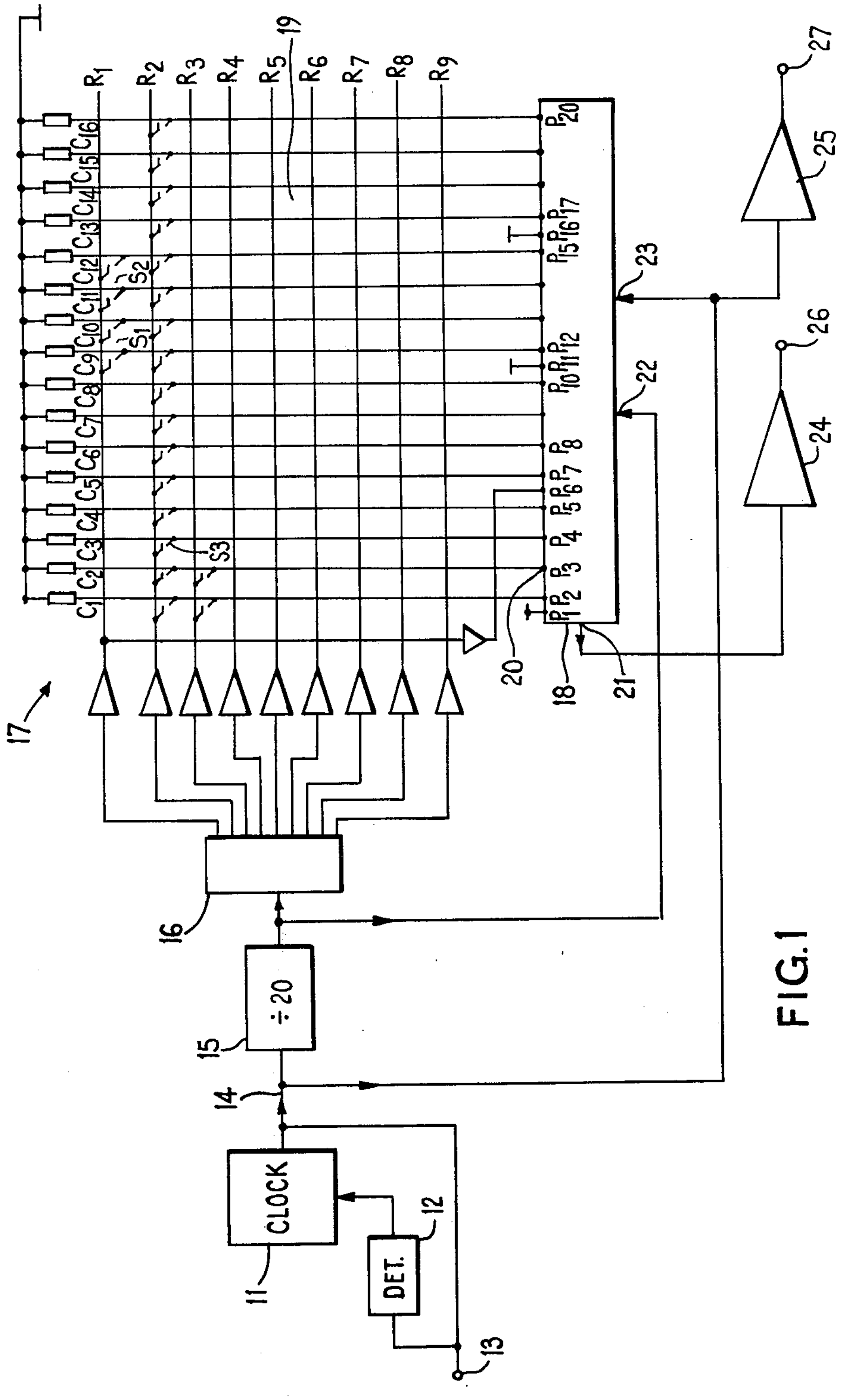

This invention relates to price setting arrangements and in particular to such setting arrangements for remotely controlled apparatus at which any one of a number of products, each of which may have a price different from the others, may be selected.

One example of such remotely controlled apparatus is for dispensing liquid fuel, such as petrol, at so-called "self-service" sites where a plurality of dispensers, or pumps, under the control of a central supervisor are arranged to be operated by customers who select the grade of fuel required and dispense it themselves. Measurement of the fuel dispensed and calculation of the cost incurred is performed in the dispenser by apparatus monitored by the supervisor. Such apparatus and the control thereof is described fully in our co-pending application No. 35883/75.

Whereas in operation the cost of a delivery, calculated from data generated by the dispenser, is both transmitted to the central apparatus and displayed to the customer, it is necessary to generate within each dispenser for display to the customer the unit price charged for each product prior to operation of the dispenser. This has been done in the past by having switching means relating to all possible prices connected to the grade selector switch whereby as each grade is selected the unit price for that grade is determined by the switching means is displayed on that particular dispenser. Where a large number of grade selections is possible then a large number of individual switches are required in the switching means. Furthermore, when a price change occurs, the supervisor or some other person has to set all of the switches to reflect the new unit price for each grade. This setting has to be carried out for each dispenser on the site, during which operation of the station must be suspended to avoid different dispensers indicating different charge rates.

It is an object of the present invention to provide a central unit price setting arrangement for remotely controlled apparatus at which any one of a number of products, each having a price which may be different from the others, may be selected.

According to the present invention a price setting arrangement for remotely controlled dispensing apparatus from which any one of a number of products may be selected has a transmitting unit. This unit is located separately from the remotely controlled apparatus and is operable to transmit a signal repetitively to the apparatus. The signal includes the unit prices of all the products. A receiving unit is carried by the remotely controlled apparatus and includes recognition means responsive to the selection of a particular product to recognise the unit price signal transmitted in respect of that product. Comparison means is used to compare the recognised received price signal in each transmission with a signal stored from a previous transmission together with circuitry responsive to a predetermined successive number of comparisons made without identity between the received price signal and the stored signal to replace the stored signal by the received price signal.

The transmitting unit may comprise manually settable switches operable to produce for each unit price a unique binary word of fixed length and a scanner operable to produce the binary word representing each unit price in turn and to transmit the binary words in a sequence.

The switches may comprise a shift register having a plurality of parallel loading inputs corresponding to the number of bits of the fixed length word. A switching matrix comprising a plurality of input lines, one for each product is employed with a plurality of output lines. Each output line is connected to individual inputs of the shift register, the input and output lines being connectable by individually closable switches. Thus when any input line is energised, selected output lines, joined by closed switches, apply a signal to associated shift register inputs to produce a serial binary word which can be clocked out of the shift register output.

The scanning means may comprise a divider circuit responsive to clock pulses applied to the shift register to divide the clock frequency by the number of bits in each fixed length word. The divided signal is applied to the shift register to load into the shift register the word appearing at the input terminals thereof after the previous one has been clocked out serially. A further counter is responsive to the divided signal to energise each input line of the switching matrix in turn to provide a new word for the shift register each time it is loaded.

The transmitting unit may include further switches operable to produce a control word serving to identify the start of transmission and to transmit the control word followed by said unit price identifying words.

In the measuring unit the recognition structure may comprise to provide a product code signal representing the number of the product selected in the sequence in which the unit price identifying words are generated. A timer provides a number which increases by one in synchronism with each word transmitted. A comparator is operable to compare the two signals and provide a recognition signal when the word number of the sequence thereof, corresponds to the product selected.

The transmitting unit may also include a monitor receiving unit operable to simulate selection of any one of the products selectable at the remotely controlled apparatus. The receiving unit is arranged to receive signals transmitted and to display the unit price of the product whose selection is simulated.

Figure 2:
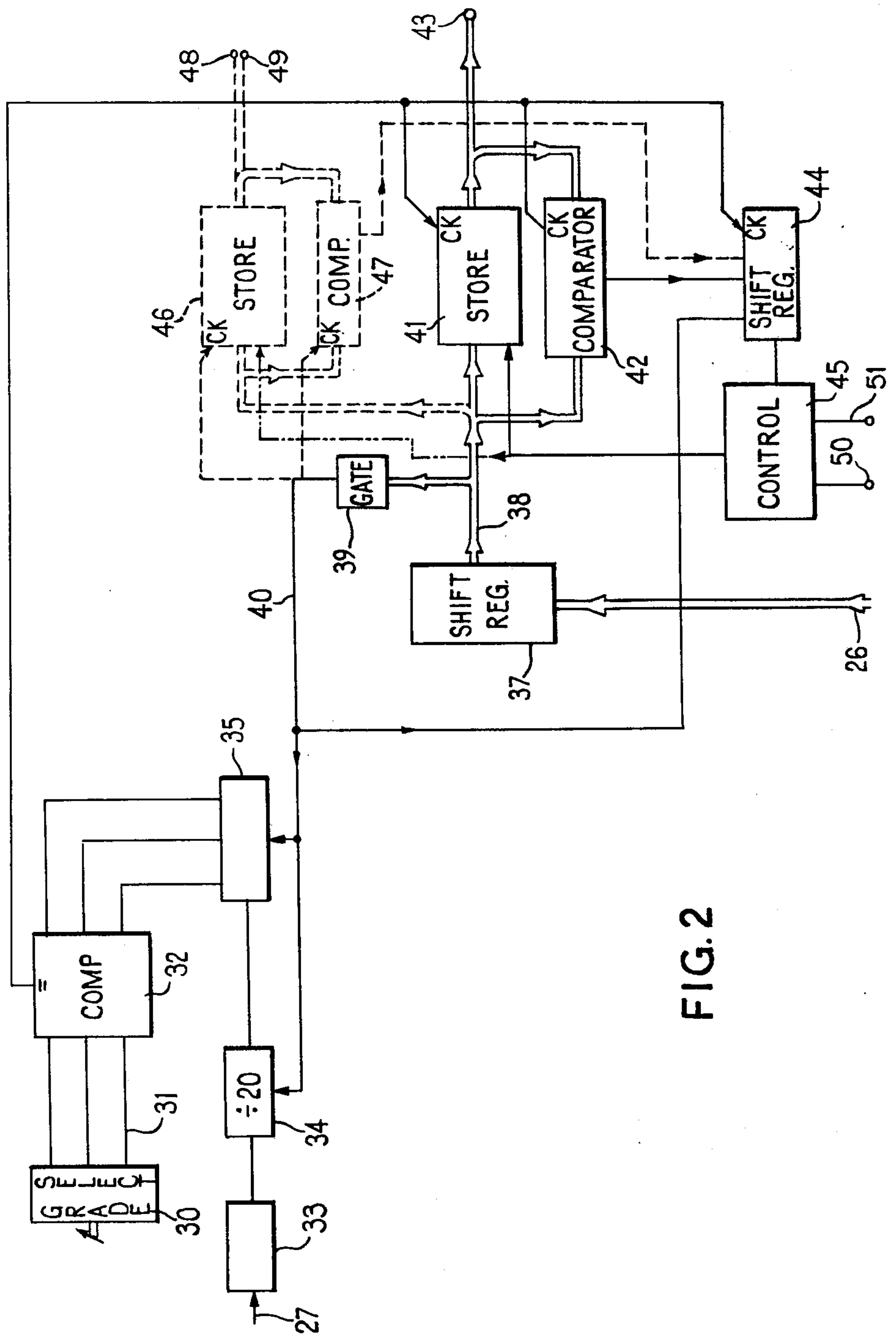

An embodiment of the invention will now be described by way of example with reference to the accompanying drawings, in which:

FIG. 1 is a schematic circuit block diagram of the transmitter unit of the present invention; and FIG. 2 is a schematic circuit block diagram of the receiver unit of the present invention.

The principle of operation of the invention as applied to dispensing motor fuel will be described before the circuit in order to help in understanding of the latter. The remotely controlled unit is one of several self-service fuel pumps subject to a central control. Each pump is able to deliver up to eight grades of fuel, the grade for delivery being selected by the customer at the start of the operation.

When a grade is selected it is necessary to display to the customer the unit price to be charged for that grade of fuel.

To this end a transmitter unit at the central location generates and transmits repetitively to all pumps a binary signal comprising nine words each of twenty bits length. The first word is a control word and contains identity and control information. It serves to transmit a code identifying the start of a transmission sequence, correct reception of which code is required to permit subsequent operation. Part of the word may contain control information for the pump, for example, switching between self-service and operator control and/or to introduce a scaling factor, such as changing the position of a decimal point. The subsequent eight words are each related to the unit price of an individual grade of fuel and are transmitted in succession after the control word. The control word is in two parts, each of ten bits length, an initial 1 followed by nine 0's defining the start of the sequence after which each fifth bit is a 1. Thus the second part of the first word has two groups of four bits which may contain control information.

Of the subsequent twenty-bit words each fifth bit is again a 1 so that no confusion can arise between them and the control word, the other sixteen bits being available to contain information.

The signal is transmitted under the control of clock pulses so that each word lasts for twenty clock cycles and the whole signal is repeated every 180 cycles of the clock.

The receivers in the pumps are identical and each receives each control and price identifying word in the order of transmission, that is, for grades one to eight. The grade selection switch functions to identify grades selected in the same order as they occur in transmission. Say the selector switch is set to grade five, then after the control word is received the number of words received are counted until the fifth is received and it is only this word which is recognised and acted upon. The received word is passed to a comparator with a stored previously received word. The stored word is continuously displayed. If the comparison is positive, that is, there is identity, the unit price is assumed unchanged and the stored value retained. If the comparison is negative, that is, there is non-identity, a signal is produced and if several, say three, successive negative results are achieved the unit price is assumed to have changed and the word newly received is shifted into the store to represent the new unit price. In this way random occasional disturbances of the signal are ineffective in changing the stored word but a consistent change due to a modified transmitted signal does effect such a change.

In order to implement the operating scheme the unit price transmitter shown in FIG. 1 comprises a clock pulse generator 11, operation of which may be inhibited by a detector circuit 12, connected to a circuit input terminal 13 and through which externally generated clock pulses may be supplied. The output line 14 of the clock is connected to a divide-by-twenty circuit 15, the output of which is connected to a counter 16. The counter 16 has nine output terminals and is arranged to produce an output at each in turn in a repetitive cycle. A switching unit 17 comprises a shift register 18 and a switching matrix 19. The shift register 18 has twenty parallel input terminals P1–P20 and a serial output terminal 21. The register is loaded, that is a binary word formed by signals appearing on the input terminals P1 to P20 is entered into the register, when a signal from the divider 15 is applied to a "load" terminal 22, and the word is clocked out serially by clock pulses from line 14 applied to terminal 23.

In accordance with the desired formats of transmitted words, inputs P1, P11 and P16 are connected to a positive supply rail as is P6, except when the control word is generated, so that every fifth bit is normally a 1. The other inputs P2–P5, P7–P10, P12–P15, P17–P20 are connected to the switching matrix.

The switching matrix comprises nine input lines (or rows) R1–R9 connected one each to a corresponding output of the counter 16 and sixteen output lines (or columns) C1–C16 connected one each to a corresponding input of the shift register 18.

The line R1 is connected to input P6 by way of an inverting amplifier and the input is normally energised like P1, P11, and P16 when R1 is de-energised but is de-energised i.e. becomes a '0', when R1 is energised so that the first ten bits of the control word are automatically generated in the shift register 18. The line R1 is also connected to lines C9 and C10 by switch S1 and to lines C11 and C12 by switch S2 so that by operation of S1 and S2 the second part of the word can be used to transmit control instructions which will be described in detail later.

All of the remaining lines R2–R9 are connected to lines C1–C16 at the intersections between sets of lines by way of switches shown symbolically at S3 and each including an isolating diode (not shown).

The price of each grade is entered by closing selected switches on each line representing a particular grade to produce a binary equivalent of the price.

To consider performance of the transmission operation with reference to the circuit described, clock pulses are generated at 400 Hz producing word-loading pulses at 20 Hz. At each word-loading pulse a different line Rn of the switching matrix is energised and the appropriately energised lines C1–C16 apply inputs to the shift register 18 in addition to the fixed inputs. The word-loading pulse causes the word to be loaded into the shift register where it is clocked out of output 21 serially by the next twenty clock pulses before the next word-loading pulse is generated. Nine words are generated in turn and transmitted continuously from an output amplifier 24 on line 26.

At the same time clock pulses are transmitted continuously by way of an amplifier 25 on line 27.

The receiver located in each pump is shown schematically by the block diagram of FIG. 2. The grade selector switch 30 of the pump produces a product code signal in the form of binary number 1 to 8, according to the selection, on lines 31 applied to one input of a binary comparator 32. A receiver 33 accepts the 400 Hz clock signal on line 27 from amplifier 25 and feeds an output to a resettable divide-by-twenty circuit 34. The divider circuit 34 feeds pulses to a counter 35 which provides a different binary output for each pulse until reset. The binary outputs are fed to the other input of the comparator 32 which provides an output when there is identity between the binary signals. In operation the divide-by-twenty circuit 34 and counter 35 are reset by a signal produced as hereinafter described when the control word is received. Counter 35 thus produces an increasing output for each subsequent word received by the pump and when the word representing the selected grade is received the comparator 32 provides a recognition signal. This part of the receiver comprises a recognition means.

The transmitted signal is applied on line 26 to a shift register 37 which provides each twenty-bit word at parallel outputs indicated by 38. A gating arrangement 39 receives the first 10 bits entered into the shift register and if the word consists of "1" followed by nine "0"s the gate passes a reset signal on line 40 to the divide-by-twenty circuit 34 and counter 35 of the recognition means.

The parallel outputs of the register 38 are fed also to corresponding inputs of a store 41 and of a comparator 42. The output terminals of the store are fed to display devices by way of terminals 43 and to the other inputs of the comparator 42. The comparator is arranged to provide an output signal to a shift register 44 when there is no identity between the signals applied. The store 41, comparator 42, and shift register 44 are all operated under the control of recognition signals applied to their clock inputs by the output of comparator 32 so that operation takes place once in each transmission for the received word representative of the selected grade but for no other.

Each time the word corresponding to the selected grade is received that word is fed to the comparator 42 with the stored word 41, which stored word is also fed to the display to indicate the unit price of the selected grade.

If the comparison is true, that is, the received word is identical with the stored word, the comparator gives an output to a shift register 44 to reset it to zero.

If the comparison is not true, that is, there is non-identity, a shift signal is fed to the shift register 44. If three successive untrue comparisons are made the shift register 44 gives an output signal to a control circuit 45. This applies a "load" signal to the store 41 to replace the previously stored value with the currently received one.

The signal may be used to control the pump motors using lines 50 and 51, if desired, such that a deliberate price change when the pump is in operation causes discharge to terminate until a new operation, at new price, is commenced.

Initially the store 41 will be empty which means that after switch-on the first three comparisons are untrue and on the third transmission cycle the unit price value of the selected grade is entered into the store for display. With a clock frequency of 400 Hz and a message time of 180 clock cycles the display is visible after less than two seconds. Similarly where there is a deliberate grade reselection, or unit price change, the new unit price becomes visible in less than two seconds. In the particular application of petrol pumps this delay between change and display is acceptable. On the other hand if noise interferes with the transmission such that the selected price word is interfered with, by having a bit change in one or more locations, for one or two transmissions the comparator 42 gives an output signal but because the change is not maintained the shift register 44 does not give an output signal to change the stored unit price value.

Earlier it was mentioned that only part of the first word of each transmission was required to identify the start of a sequence. The outputs of register 37 corresponding to this part of the word are fed to gate 39 as hereinbefore described. Some of the remaining outputs of register 37 comprise a sub-word or sub-words and are fed to a further store 46, similar to store 41, and to a parallel comparator 47, similar to comparator 42. Comparator 47 is also connected to the shift register 44 to reset it when a successful comparison is made and store 46 feeds two output terminals 48 and 49.In the example illustrated by FIG. 1 two subwords are characterized by the states of switches S1 and S2 respectively in the transmitter and the terminals 48 and 49 are present signals representing those of sub-words. The sub-words defined by the position of switch S1 serves to indicate the position of a decimal point in the display of unit price, effectively providing a $\times 10$ scaling factor. The sub-word represented by switch S2 is recognized in conventional manner by a control circuit (not shown) which determines whether the pump is to be operated in a self-service mode for example by preventing unauthorized removal of the dispenser nozzle. It will be understood that the sub-words received may be used to operate subsidiary display parts and/or initiate control functions to be undertaken by subsidiary control parts of the dispenser.

Whereas the store 41 and comparator 42 are triggered once per transmission upon recognition of the appropriate price word by signals from the comparator 32, the store 46 and comparator 47 are triggered once per transmission by correct reception of the first part of control word, by a signal on line 40.

Where each dispenser is employed as one of many under the supervision of an operator or cashier at the central location the transmitting unit may include a monitor receiving unit containing a grade selection switch 30 and display unit so that the operator can select any one of the grades to verify that the correct unit price is being transmitted for the grade selected.

The price setting arrangements is not of course limited to use with petrol pumps or the dispensing of fuel. It may be employed with only minor changes to other forms of dispenser of other products.

What we claim is:

1. A price setting arrangement for remotely controlled dispensing apparatus from which any one of a number of products may be selected, comprising a transmitting unit located separately from the remotely controlled apparatus and operable to transmit repetitively to the apparatus a signal which includes the unit prices of all the products, and a receiving unit carried by the remotely controlled apparatus and including recognition means responsive to the selection of a particular product to recognise the unit price signal transmitted in respect to that product, comparison means operable to compare the recognised received price signal in each transmission with a signal stored from a previous transmission, and means responsive to a predetermined successive number of comparisons made without identity between the received price signal and the stored signal to replace the stored signal by the received price signal.

2. A price setting arrangement for remotely controlled dispensing apparatus from which any one of a number of products may be selected, comprising a transmitting unit located separately from the remotely controlled apparatus including manually settable switching means operable to produce for each unit price a unique binary word of fixed length, and scanning means operable to address the switching means and to select each binary word in turn and to transmit the binary words in a sequence which includes all of the unit prices, and a receiving unit carried by the remotely controlled apparatus including recognition means responsive to the selection of a particular product to recognise the unit price signal transmitted in respect of that product, comparison means operable to compare the recognised received price signal in each transmission with a signal stored from a previous transmission, and means responsive to a predetermined successive number of comparisons made without identity between the received price signal and the stored signal to replace the stored signal by the received price signal.

3. A price setting arrangement as claimed in claim 2 in which the switching means comprises a shift register having a plurality of parallel loading inputs corresponding to the number of bits of the fixed length word and a serial output, and a switching matrix comprising a plurality of input lines, one for each product, and a plurality of output lines each connected to individual inputs of the shift register, said input and output lines being connectable by individually closable switches whereby when any input line is energised selected output lines joined thereto by closed switches apply a signal to associated shift register inputs to produce a serial binary word which can be clocked out of the shift register output.

4. A price setting arrangement as claimed in claim 3 in which a number of inputs of the shift register are connected to particular voltage levels to determine fixed input states for every price identifying word.

5. A price setting arrangement as claimed in claim 3 or claim 4 in which the scanning means comprises a divider circuit responsive to clock pulses applied to the shift register to divide the clock pulse frequency by the number of bits in each fixed length word, said divided signal being applied to the shift register to load into the shift register the word appearing at the input terminals thereof after the previous one has been clocked out serially, and a further counter responsive to said divided signal to energise each input line of the switching matrix in turn and provide a new word for the shift register each time it is loaded.

6. A price setting arrangement as claimed in claim 2 in which the receiver unit includes storage means capable of storing a word of fixed length received from the transmitter and the comparison means comprises a word comparator arranged in each transmitted sequence to accept at one input thereof a signal consisting of a word of fixed length from the storage means, to accept at another input a signal consisting of a word of fixed length received from the transmitter in the transmitted sequence and responsive to a signal from the recognition means when the received signal corresponds to the selected product to compare the two signals and produce a comparator signal indicative of whether or not there is identity between the input signals applied to the comparator.

7. A price setting arrangement as claimed in claim 6 in which the means to replace the stored signal comprises a shift register responsive to a comparator signal indicative of a difference between received and previously stored signals to cause a bit contained in the shift register to be shifted one location and responsive to a comparator signal indicative of identity between received and previously stored signals to cause the bit to be moved to a reset location, the shift register having an output terminal which provides a shift register output signal after the bit has shifted from its reset position through a predetermined number of locations, and control means responsive to a shift register output signal to cause a signal received in the current transmitted sequence, and representative of the price of the selected product, to be entered into the storage means to replace a previously stored value.

8. A price setting arrangement as claimed in claim 7 in which the control means is also operative to provide an inhibit signal to terminate operation of dispensing apparatus if a price change is recognised during a dispensing operation.

9. A price setting arrangement as claimed in claim 2 in which the recognition means comprises means operable to provide a product code signal representing the number of the product selected in the sequence in which the unit price identifying words are transmitted, timing means operable to provide a signal representing a number which increases by one in synchronism with each word transmitted and comparison means operable to compare the two signals and provide a recognition signal when the word number of the sequence corresponds to the product selected.

10. A price setting arrangement as claimed in claim 9 in which the timing means comprises a receiver of clock pulses transmitted by the transmitter unit, division means arranged to divide the clock frequency by the number of bits in each unit price identifying word and register means operable to provide a number which increases in response to successive outputs of the division means.

11. A price setting arrangement as claimed in claim 2 in which the transmitting unit includes further switching means operable to produce a control word serving to identify the start of transmission and to transmit the control word followed by said unit price identifying words.

12. A price setting arrangement as claimed in claim 11 in which the receiver includes input shift register means responsive to the serially transmitted signal to give a parallel output, at a plurality of terminals, corresponding to each word transmitted in turn and gating means responsive to outputs at terminals energised by the control word to give a reset signal to the recognition means.

13. A price setting arrangement as claimed in claim 12 in which part of the control word is arranged to identify the start of a transmission sequence and part of the control word comprises at least one sub-word arranged to contain control instructions for subsidiary parts of the dispensing apparatus, the receiver including means to store each sub-word and apply the stored sub-word to said subsidiary parts, a control comparator having inputs to accept each stored sub-word and signals from the received control word and responsive to a reset signal to the recognition means to compare the two signals and produce a control comparator signal indicative of whether or not there is identity of the signals, and means responsive to a predetermined successive number of comparison made without identity to replace the stored sub-word or -words by the received sub-word or -words.

14. A price setting arrangement as claimed in claim 1 or claim 2 in which the transmitting unit contains a monitor receiving unit including means operable to simulate selection of any one of the products selectable at the remotely controlled apparatus, said receiving unit being arranged to receive signals transmitted and to display the unit price of the product whose selection is simulated.

* * * * *